United States Patent Office 3,104,970
Patented Sept. 24, 1963

3,104,970
PRODUCTION OF RARE EARTH METALS
James H. Downing, Buffalo, and Henry L. Gorski, Tonawanda, N.Y., and Ernest L. Koerner, Jr., Bridgeton, Mo., assignors to Union Carbide Corporation, a corporation of New York
No Drawing. Filed Feb. 16, 1961, Ser. No. 89,622
5 Claims. (Cl. 75—84)

This invention relates to the production of rare earth metals and, more specifically, to the production of rare earth metals of the lanthanide series from oxidic starting materials.

The formidable problem of separating rare earth metals from their oxides and from each other has led to the development of many unusual techniques and processes for this purpose.

Electrolytic methods and exotic quantitative chemical methods have produced the metals in distinct form but such processes are complicated and expensive endeavors.

Attempts to employ displacement-metal metallurgy on the rare earths are quite numerous and this technique was employed as early as 1890 by Winchler, 1900 by Malignao, and 1902 by Halon. These artisans used magnesium as the reductant but were unable to cause metal separation. Later attempts were made with calcium as a reductant but again no success was achieved. Aluminum and halogen compounds were also employed by others in an attempt to produce the rare earth metals from their oxides and in certain cases an impure alloy was obtained but further attempts to obtain the rare earth metals in singular form were unsuccessful. Daane, Dennisen, and Spedding postulated that the high heat of formation of lanthanum oxide would possibly permit the metal lanthanum to be used in displacing some of the rare earths from their oxides. This reaction was successfully conducted but the current price of lanthanum virtually relegates the process to the laboratory.

In general, it can be stated that slight commercial success has been achieved in separation processes employing displacement metals.

Practically no success has been achieved in the use of the classical carbon reduction methods so long employed in the metallurgical industry.

The problem of the separation of rare earth metals would have been more easily resolved if some compounds of this group could be synthesized so as to exhibit sufficient divergence in thermal and chemical properties to render them amenable to distillation processes. Of course these compounds must necessarily possess stability and non-corrosiveness of a level which would render them amendable to economical process methods in commercially available containers.

Misch metal was treated in a molybdenum container at temperatures consistent with the volatization level of the various alloy constituents and approximate classification was achieved but the less volatile residue seriously attacked the container.

Spedding and Daane further attempted to utilize tantalum metal containers in a lanthanum displacement and fractional distillation process under improved conditions. Although some rich fractions were obtained, pure metals did not result.

It is therefore an object of the present invention to provide a process for the production of pure rare earth metals by a carbon reduction in vacuo that is economical and easily controlled.

It is further an object of the present invention to separate the rare earth metals from their mixed oxides as pure metal fractions.

Further objects will become apparent after viewing the remaining disclosure and the appended claims.

A first process for achieving reduction of the rare earth metal oxide, volatization and condensation of the rare earth metal in the oxide comprises preparing one rare earth oxide selected from the group consisting of samarium, neodymium, europium, dysprosium, holmium, erbium and thulium in admixture with a solid carbonaceous reducing agent and furnacing the mixture in vacuo. The composite charge is therein reduced and the selected rare-earth-metal is distilled and collected on condenser surfaces.

Another process achieving reduction and separation of rare earth metals from a mixture of their oxides comprises preparing samarium oxide and at least one rare-earth oxidic material selected from the group consisting of neodymium, lanthanium, cerium, and praseodymium in admixture with a solid carbonaceous reducing agent and furnacing the mixture in vacuo. The composite charge is therein reduced and rare-earth-metals are fractionally distilled and collected on condenser surfaces. Several volatization and condensation steps may be required depending upon the number of original rare earth metals charged and the degree of purity desired in the final fractionated metal.

The oxidic starting material used in the present process can be selected from numerous oxidic ores of the rare-earth metals and from synthetic or secondary oxides as produced by standard concentration steps such as ion-exchange and solvent extraction. The purity of the starting mixture does not appreciably affect the reduction but simply dictates the repetition necessary in the ensuing selective volatization steps to produce a product of the desired purity. Oxidic starting materials which are readily available in purities of greater than about 90 percent by weight rare-earth metal oxide are preferable but not required.

The solid carbonaceous reducing agent employed should be relatively free of substantial amounts of metallic oxides. Graphite and resistor carbon are examples of useful reductants.

It has been found that at least an amount of carbon in excess of that amount required to react with the oxygen in the rare earth metal oxides is required. One to 15 percent excess is considered desirable and 5 to 10 percent excess is preferred.

The admixture of the oxidic materials and carbon should be intimate so as to provide maximum contact between the reactants which aids in obtaining complete reduction. The maximum particle size is about 50 microns. It has also been found in the practice of the present invention that pelletization of the starting mixture before furnacing aids in the egress of oxides of carbon and metallic vapors produced during furnacing.

Suitable furnacing of the starting materials in the reduction fractional-distillation step and the reduction-volatilization step in each of the above processes is accomplished in any number of standard vacuum furnaces, including the induction and electrical resistance types. The only critical requirement is that they be capable of supporting a vacuum.

The condensing zone may be within the vacuum-reduction and vaporization device or it may comprise a separate device. The condensing zone itself does not affect the separation process except, of course, the condensing zone must be maintained at such a condition as to allow condensation of the metal vapors without further oxidation.

Materials for the condensation zone must be judiciously chosen. The lower carbon oxide by-product of the present process exhibits considerable activity at high temperatures and low pressures with some metals. In addition the rare earth metals themselves will alloy or otherwise form intermetallic compounds with a variety of metals. It has been found that the use of carbon circumvents the pitfalls caused by reactive carbon oxides formed in the reduction step. Indeed the use of carbon as the condenser material at least to collect the first condensate is a requirement in the present process when the condensing zone or surface is exposed to carbon monoxide because the use of carbon precludes deleterious attack on the condenser surface. Tantalum and molybdenum are examples of metals which may be used as condensers since they do not appreciably alloy with the rare-earth metals. Tantalum and molybdenum may not be used as the first condenser in the presence of substantial amounts of the lower carbon oxide.

The temperatures and vacuum pressures employed in furnacing are closely interrelated and largely dependent on the oxidic starting materials and the rare earth metal contained therein. Routine experimentation with the process disclosed herein and conducted according to the present invention would readily afford the proper and workable combinations, some of which are noted in the exemplary portion of this disclosure. It has been found that a pressure of approximately 1.0 micron or less is preferred in production of rare earth metals by the present process. Temperatures in the initial reaction zone must be sufficient to cause reduction of the oxides and vaporization of the rare metals and the condenser must be maintained at a temperature low enough to cause condensation of the metal vapors.

When two or more different rare earth metals are present in the starting mixture, the most volatile metal will be present in the greatest atomic percentage on the first condenser surface. The first surface may now be utilized as a working surface for subsequent fractional distillation steps. The condensate on the first condenser surface is then fractionally distilled at a temperature sufficient to cause the excitation and vaporization of the rare-earth metals. The rare-earth metal is then condensed on a surface of molybdenum or tantalum if the lower carbon oxide is not present in damaging amounts. These metals will not alloy with the rare earth metals. The residue may be recycled in the process or rejected, depending upon the amount of remaining rare-earth metal present therein. The residue from the initial reduction and fractional-distillation step is re-treated by subsequent fractional-distillation steps until the fractions, whether they be condensates or residues, are of the desired purity in each rare earth metal sought.

An examination of the following examples will further aid in understanding the present invention by exemplifying step by step embodiments of the present invention.

Example I shows the process for reduction, volatization and production of a single rare earth metal from its corresponding oxide.

Example I

Seventy-nine weight percent of samarium oxide of 99.9 percent purity was prepared in intimate admixture with 21 weight percent of powdered graphite (12.7 weight percent carbon in excess of the stoichiometric amount required to react with all the oxygen in the oxides in the admixture) and pelletized by conventional means to form pelletized starting material measuring 0.75 inch in diameter. The pellets were charged into a vacuum induction furnace and subjected to a reduction reaction and volatization step consisting of heating the mixture to a temperature of 1700° C. under a minimum pressure of 0.5 micron and so holding for a period of three hours. The first condensate was collected on a graphite condenser as substantially pure samarium carbide. The first residue consisted of a negligible amount of unreacted samarium oxide and carbon.

The first condensate was then subjected to a volatization step consisting of heating to the temperature of 1700° C. under a pressure of 0.05 micron and so holding for a period of two hours. The second condensate was collected on a tantalum condenser and upon analysis showed the following composition in weight percent: 99.7 percent samarium, 0.05 percent carbon, 0.10 percent oxygen, 0.035 percent hydrogen, and less than 0.10 percent nitrogen. The second residue consisted of negligible amounts of samarium carbide. The first residue may be recycled in the process by introducing it in the starting mixture.

The applicants have thus treated samarium as the oxide which is one of the most difficult, commonly available metals of the lanthanide series to refine. Samarium metal forms notoriously stable compounds with oxygen. This process may also be utilized to produce neodymium, europium, dysprosium, holmium, erbium and thulium from their respective oxides.

Example II illustrates the process of reduction and separation of rare earth metal from mixtures of rare earth metal oxides by fractional-distillation.

Example II

Seventy-eight percent by weight of rare earth oxides consisting of 88 percent $Sm_2O_3$ and 20 percent $Nd_2O_3$ were prepared in intimate admixture with 22 weight percent of powdered graphite (1.8 weight percent carbon in excess of the stoichiometric amount required to react with all the oxygen in the oxides in the admixture). The intimate admixture was pelletized by conventional means so as to produce a starting material 0.75 inch in diameter. The pellets were charged into a vacuum induction furnace and subjected to a reduction reaction and fractional-distillation step consisting of heating to a temperature ranging from 1700–1700° C. at a pressure of 0.15 micron and so held for about 8 hours with concurrent vaporization and condensation of the rare earth metal vapors on a graphite condenser. The mixed carbides of samarium and neodymium were collected as a first condensate which analyzed approximately 90 percent samarium carbide. The first residue contained approximately 95 percent neodymium carbide and 5 percent samarium carbide.

The first condensate was then subjected to a fractional-distillation step by reheating in a graphite crucible to a temperature of 1700° C. under a minimum pressure of 0.05 micron and so held for a period of 2 hours. The second condensate was collected on a tantalum condenser. The second condensate analyzed 0.04 percent carbon, 0.18 percent oxygen and the remainder samarium metal. The analysis was conducted by fluorescent X-ray and the presence of neodymium was not detected. The second residue analyzed approximately 50 percent samarium carbide and 50 percent neodymium carbide.

The first residue was subjected to a fractional-distillation step which consisted of reheating the residue in a carbon crucible to a temperature of 1600° C. at a minimum pressure of 0.05 micron and so holding for a period of 1 hour. The third condensate was collected on a graphite condenser and upon analysis revealed approximately an equal weight percent of samarium and neodymium carbide. The third residue analyzed substantially pure neodymium carbide.

The third condensate was then subjected to a fractional-distillation step which consisted of reheating the residue in a graphite crucible to a temperature of 1900° C. under a minimum pressure of 0.05 micron and holding it at that temperature for a period of 3 hours. The fourth condensate was collected on a tantalum condenser and upon analysis revealed the following composition; 99.21 percent neodymium and 0.83 percent carbon. The fourth residue consisted mainly of minute amount of neodymium carbide. The second residue, and fourth residue may be admixed with the starting mixture to complete the separation and recovery of the remaining samarium and neodymium if desired.

The present process may also be utilized to separate samarium from at least one of the group consisting of lanthanum, cerium, and praseodymium.

What is claimed is:

1. A process for producing rare-earth metals comprising preparation of an intimate admixture of one oxide of a rare earth metal selected from the group consisting of samarium, neodymium, europium, dysprosium, holmium, erbium and thulium, and an amount of carbonaceous reducing agent in excess of that amount required to stoichiometrically react with all the oxygen of the oxides in the admixture; charging said admixture into a vacuum furnace; evacuating and maintaining said vacuum furnace at a pressure of less than about 1.0 micron and increasing the temperature of the said vacuum furnace to a sufficiently high level to cause a reduction of said selected rare-earth metal oxide by said carbonaceous reducing agent, formation of said selected rare-earth metal and volatization of said selected rare earth metal to produce a first-vapor of said selected rare earth metal and a first-residue; conducting said first vapor of said selected rare earth metal to a vacuum condensing zone wherein the condensing surface of the said condensing zone is a graphite condensing surface and allowing the condensation of said first-vapor on said graphite condensing surface to form a first-condensate, said first-condensate being substantially comprised of the carbide of said selected rare-earth metal; and subjecting said first-condensate to a volatization step comprising evacuating and maintaining said vacuum furnace at pressure of less than about 1.0 micron and increasing the temperature of said vacuum furnace to a sufficiently high level to cause volatization to occur thereby producing a second-vapor of said selected rare earth metal and second-residue; and conducting said second-vapor to a condensing zone wherein the condensing surface is a metallic condensing surface selected from the group consisting of tantalum and molybdenum and causing condensation of said second-vapor on said metallic condensing surface to form a second-condensate, said second-condensate being comprised essentially of the pure metal of the said selected rare-earth oxide.

2. A process for seperating rare-earth metals of the lanthanide series from their oxidic starting components comprising preparation of an intimate admixture of samarium oxide and at least one rare-earth metal oxide selected from the group consisting of neodymium, lanthanum, cerium and praseodymium and an amount of carbonaceous reducing agent in excess of that amount required to stoichiometrically react with all the oxygen of the oxides in the admixture; charging said admixture into a vacuum furnace; evacuating the air from said vacuum furnace to an initial pressure of less than about 1.0 micron and maintaining the pressure at less than about 1.0 micron during the process and increasing the temperature of the said vacuum furnace to a sufficiently high level to cause a reduction of said selected rare-earth metal oxides by said carbonaceous reducing agent, formation of said selected rare earth metal and fractional-distillation to produce a fractionally-distilled first-vapor of the metals of the said selected rare-earth metallic oxides, said first-vapor being substantially comprised of samarium, and a first-residue, said first-residue being substantially comprised of the carbides of the least volatile metals of the said selected rare-earth metallic oxides; and conducting said fractionally distilled-first-vapors to a condensing zone wherein the condensing surface of the said vacuum condensing zone is a graphite condensing surface and allowing the condensation of said first-vapors on said graphite condensing surface to form a first-condensate, said first-condensate being substantially comprised of the carbide of samarium; subjecting said first-condensate to a fractional distillation step comprising evacuating said vacuum furnace to an initial pressure of less than 0.1 micron and increasing the temperature of said vacuum furnace to a sufficiently high level to cause fractional distillation to occur thereby producing a fractionally-distilled second-vapor and second-residue wherein said second-residue is comprised essentially of the carbides of said metals of said selected rare-earth metallic oxides; conducting said fractionally-distilled second-vapor to a condensing zone wherein the condensing surface is a metallic condensing surface selected from the group consisting of molybdenum and tantalum and causing condensation of said second-vapor on said metallic condensing surface to form a second-condensate, said second condensate being comprised of substantially pure samarium.

3. A process in accordance with claim 2 wherein said first-residue is subjected to a fractional-distillation step comprising evacuating said vacuum furnace to an initial pressure of less than 1.0 micron and maintaining the pressure at less than about 1.0 micron during the process and increasing the temperature of said vacuum furnace to a sufficiently high level to cause fractional-distillation to occur thereby producing fractionally-distilled third-vapors of the metals of the said first residue and a third-residue wherein the said third-residue is comprised essentially of the least volatile rare-earth metal of the said selected rare-earth metallic oxides; conducting the said fractionally-distilled third-vapors of the metals of the said residue to a condensing zone wherein the condenser of the said vacuum condensing zone is a carbon condenser and causing condensation of the said fractionally-distilled third-vapors on said carbon condensing surface, said third condensate being a mixture of the carbides of the said rare-earth metals of the said selected rare-earth metallic oxides and submitting said second-condensate, second-residue, third-condensate and third-residue and all successive condensates and residues derived therefrom to fractional-distillation in accordance with the method delineated in claim 1 until a separation is accomplished between said selected rare-earth metals.

4. A process for producing rare-earth metals comprising preparation of an intimate admixture of substantially pure samarium oxide and an amount of carbonaceous reducing agent in excess of that amount required to stoichiometrically react with all the oxygen of the oxides in the admixture; charging said admixture into a vacuum furnace; evacuating and maintaining said vacuum furnace at less than about 1 micron and increasing the temperature to and maintaining the temperature of said furnace at about 1700° C. for a period of about 3 hours to cause reduction of said samarium oxide and formation of a first-vapor of samarium and a first-residue; said first-residue being comprised of negligible amounts of unreacted samarium oxide and carbon; conducting said first-vapor to a condensing zone wherein the condensing surface of said vacuum condensing zone is a graphite condensing surface and causing said first vapor to condense on said condensing surface as a first-condensate, said first-condensate being substantially pure samarium carbide; and subjecting said first-condensate to a volatization step comprising evacuating and maintaining a vacuum furnace at a pressure of less than about 1 micron and increasing the temperature to and maintaining the temperature of said vacuum furnace at about 1700° C. for a period of about 2 hours to cause the formation of a second-vapor of samarium and a second-residue; said second-residue comprised of negligible amounts of samarium carbide; and conducting said second-vapors to a condensing zone wherein the condensing surface is a tantalum condenser to form a samarium condensate analyzing substantially pure samarium and the remainder incidental impurities.

5. The process for separating samarium and neodymium from a mixture their oxidic starting components comprising; preparing an intimate admixture of samarium oxide and neodymium oxide with an amount of carbonaceous reducing agent in excess of that amount required to stoichiometrically react with all the oxygen of the oxides in the admixture; charging said admixture into a vacuum furnace; evacuating and maintaining said vacuum furnace at a pressure of less than about one micron and increasing the temperature of said vacuum furnace to about 1920° C. and holding said temperature for a period of about 16 hours to cause a reduction reaction between said reducing agent and said samarium and neodymium oxides and fractional-distillation between said samarium and neodymium resulting from said reduction, said distillation producing a fractionally-distilled first-vapor being substantially comprised of samarium and a first-residue, said first-residue being substantially comprised of the carbide of neodymium; and conducting said first-vapor to a condensing zone wherein the condensing surface of said vacuum condensing zone is a graphite condensing surface and allowing condensation of said first-vapors on said graphite condensing surface to form a first-condensate; and subjecting the said first-condensate to a fractional-distillation step comprising evacuating and maintaining said vacuum furnace at a pressure of less than about 1 micron and increasing the temperature of said vacuum furnace to about 1700° C. and maintaining said temperature for about 2 hours to cause the formation of second-vapors and a second residue wherein said second-residue is comprised essentially of a small amount of samarium and neodymium carbide; conducting said second-vapor to a condensing zone wherein the condensing surface is a tantalum condenser and causing condensation of said second vapors on said tantalum condenser to form a second condensate analyzing substantially pure samarium and the remainder incidental impurities; and subjecting said first-residue to a fractional distillation step comprising evacuating and maintaining said vacuum furnace at a pressure of less than about 1 micron and increasing and maintaining the temperature of said furnace at about 1600° C. for a period of about 1 hour to produce a third-vapor and a third-residue wherein said third-residue is comprised essentially of samarium and neodymium; conducting said third vapor to a vacuum condensing zone wherein the condensing surface is a tantalum condensing surface and allowing condensation of said third vapor on said tantalum condenser and subjecting said third-condensate to a fractional distillation step comprising evacuating and maintaining said vacuum furnace at less than about 1 micron and increasing and maintaining the temperature of said furnace at about 1900° C. for a period of about 3 hours to produce a fourth-vapor and a fourth-residue; said fourth-residue consisting of negligible amounts of neodymium carbide; conducting said fourth-vapor to a vacuum condensing zone wherein the condensing surface is a tantalum condensing surface and allowing condensation of said fourth-vapors on said tantalum condenser to form a condensate of neodymium analyzing substantially pure neodymium and remainder incidental impurities.

References Cited in the file of this patent
UNITED STATES PATENTS

| | | |
|---|---|---|
| 1,602,542 | Marden | Oct. 12, 1926 |
| 2,564,241 | Warf | Aug. 14, 1951 |